United States Patent [19]
Saporetti

[11] Patent Number: 6,047,893
[45] Date of Patent: Apr. 11, 2000

[54] METHOD OF LOCATING AN OBJECT-APPLIED OPTICAL CODE

[75] Inventor: Claudio Saporetti, Bologna, Italy

[73] Assignee: Datalogic S.p.A., Italy

[21] Appl. No.: 09/000,797

[22] Filed: Dec. 30, 1997

[30] Foreign Application Priority Data

Dec. 30, 1996 [EP] European Pat. Off. .............. 96830661

[51] Int. Cl.[7] .............................. G06K 7/10; G06K 9/36; G06K 9/80
[52] U.S. Cl. .................................... 235/462.1; 235/462.08
[58] Field of Search ........................ 235/462.08, 462.09, 235/462.1, 462.11

[56] References Cited

U.S. PATENT DOCUMENTS

| | | |
|---|---|---|
| 4,874,936 | 10/1989 | Chandler et al. ........................ 235/494 |
| 5,268,580 | 12/1993 | He . |
| 5,296,690 | 3/1994 | Chandler et al. . |
| 5,304,787 | 4/1994 | Wang . |
| 5,504,319 | 4/1996 | Li et al. . |

OTHER PUBLICATIONS

European Search Report dated May 5, 1997 on Appln. No. EP 96 83 0661.

*Primary Examiner*—Karl Frech
*Attorney, Agent, or Firm*—Hall, Priddy, Myers & Vande Sande

[57] ABSTRACT

A method wherein an image of an object bearing an optical code is divided into a number of elementary images for which a brightness gradient vector is calculated. The calculated gradients of a magnitude above a given threshold value (Glim) are transformed to eliminate the information relative to the direction of the vector, while maintaining the information relative to the path of the vector. The transformed and quantized vectors of a subimage including a number of elementary images are added to calculate a total gradient vector, which is compared with reference values to select significant subimages containing a sufficient number of gradient vectors of substantially the same path.

27 Claims, 5 Drawing Sheets

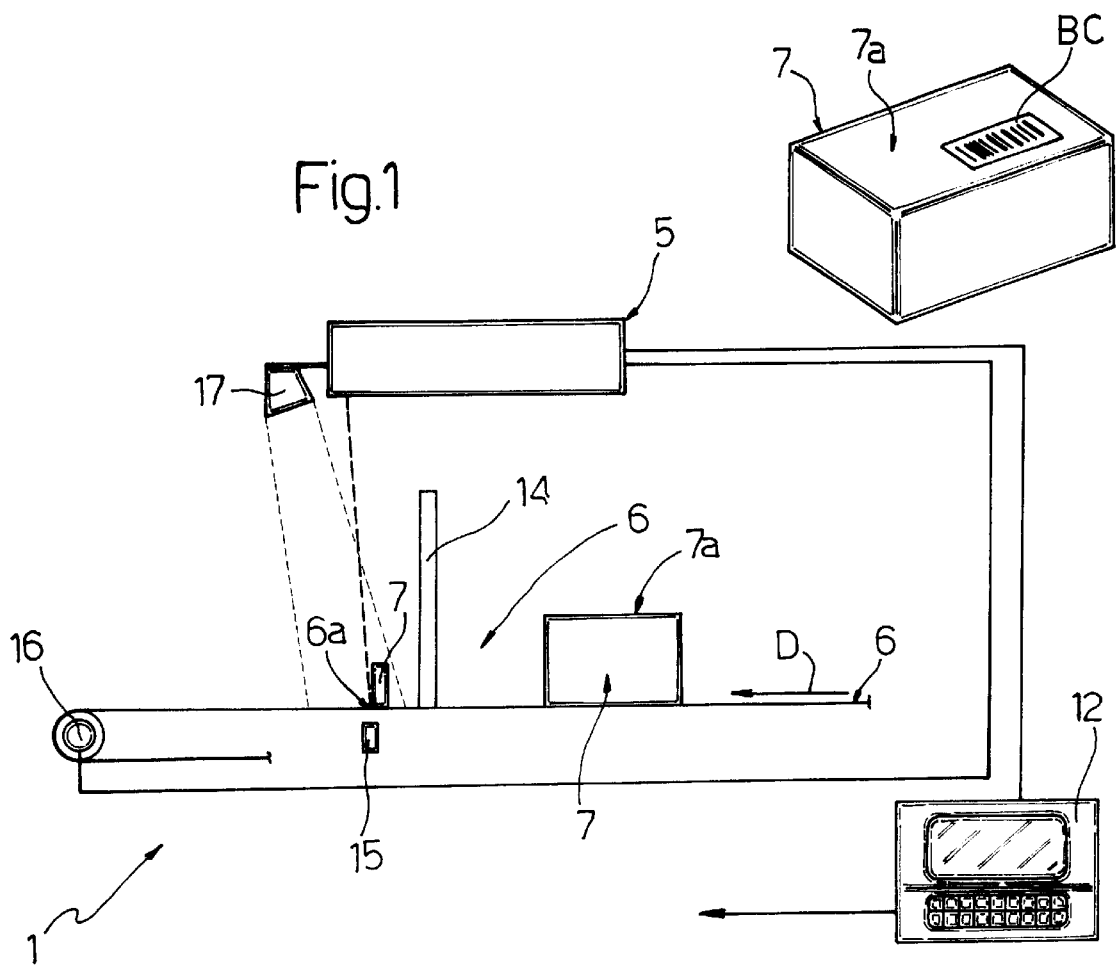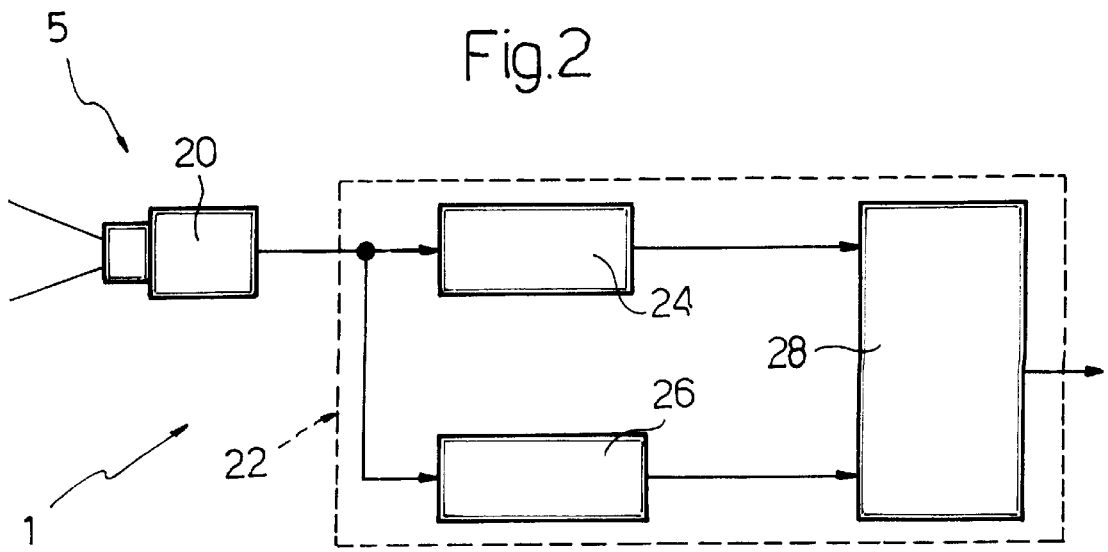

METHOD OF LOCATING AN OBJECT-APPLIED OPTICAL CODE

BACKGROUND OF THE INVENTION

The present invention relates to a method of locating an object-applied optical code.

The present invention also relates to a device implementing the above method.

Systems are known for locating optical codes—in particular bar codes—applied to objects traveling on conveying devices (e.g. conveyor belts), and for determining the presence and arrangement in space of the code. Known devices normally use laser locating and reading systems, known types of which, however, present several drawbacks: poor reliability, due to the large number of moving mechanical parts involved; limited omnidirectional reading capacity; inability to read two-dimensional codes; and poor capacity for reading plastic-coated codes.

To overcome the above drawbacks, systems have been devised featuring optical sensors (in particular, telecameras) for picking up a two-dimensional image of the object and selecting a portion of the image corresponding to the code. Such systems also provide for reading the code in the selected image portion, but suffer from the drawback of involving complex processing of a large amount of data.

SUMMARY OF THE INVENTION

It is an object of the present invention to provide a method of locating an object-applied optical code, which provides for fast, effective location of the code.

According to the present invention, there is provided a method of locating an optical code applied to an object, characterized by comprising: an image acquisition step wherein at least one image (I) of an object bearing said code is acquired; a first processing step wherein the acquired image (I) is divided into a number of elementary images (If), each comprising a predetermined number (N) of pixels, and each pixel being assigned a pixel brightness value; a second processing step wherein a brightness gradient vector (G) is calculated for each of said elementary images (If); a first comparing step wherein, from said calculated gradient vectors (G), the vectors of a magnitude above at least one threshold value (Glim) and representing rapid variations in brightness are selected; a transforming step wherein the previously selected gradient vectors are transformed to determine a given path and a given direction, which path and which direction are assigned to all the calculated gradient vectors; a tiling step wherein said acquired image (I) is divided into a number of subimages (Ip), each comprising a number of elementary images (If); a composing step wherein the previously transformed gradient vectors of a selected subimage (Ip) are added to calculate a total gradient vector (Gs); a second comparing step wherein said total gradient vector (Gs) of each of said subimages (Ip) is compared with reference values to select significant subimages containing a sufficient number of gradient vectors having substantially the same path; the significant subimages being assigned a first binary logic value; said second comparing step also determining nonsignificant subimages containing a limited number of gradient vectors having substantially the same path; the nonsignificant subimages being assigned a second binary logic value; and said method generating at least one final binary image (Ir) representing said acquired image (I) divided into said subimages (Ip), each having a respective binary logic value.

If the optical code is a bar code, the angle ($\alpha$) formed by said gradient vector with a cartesian reference system is preferably doubled during said transforming step.

During said transforming step, the angle ($\alpha$) formed by said gradient vector with a cartesian reference system is preferably multiplied by a factor equal to the number of sides of the geometric figure forming the unit element of the optical code. More specifically, if the optical code is a two-dimensional code, the unit element of which is defined by four sides, said angle ($\alpha$) is multiplied by a factor of four; if the unit element is defined by six sides, said angle ($\alpha$) is multiplied by a factor of six.

The method according to the present invention provides for rapidly and effectively locating the acquired image portion corresponding to the code, so that the code reading algorithm only operates on the portions corresponding to the optical code image, and the amount of information for processing is greatly reduced as compared with that picked up by the telecamera. Moreover, no information is lost due to elision of vectors having the same path but opposite directions.

According to the present invention, there is also provided a device for locating an optical code applied to an object, characterized by comprising: image acquisition means for acquiring at least one image (I) of an object bearing said code; first processing means wherein the acquired image (I) is divided into a number of elementary images (If), each comprising a predetermined number (N) of pixels, and each pixel being assigned a pixel brightness value; second processing means wherein a brightness gradient vector (G) is calculated for each of said elementary images (If); first comparing means wherein, from said calculated gradient vectors (G), the vectors of a magnitude above at least one threshold value (Glim) and representing rapid variations in brightness are selected; transforming means wherein the previously selected gradient vectors are transformed to determine a given path and a given direction, which path and which direction are assigned to all the calculated gradient vectors; tiling means wherein said acquired image (I) is divided into a number of subimages (Ip), each comprising a number of elementary images (If); composing means wherein the previously transformed gradient vectors of a selected subimage (Ip) are added to calculate a total gradient vector (Gs); second comparing means wherein said total gradient vector (Gs) of each of said subimages (Ip) is compared with reference values to select significant subimages containing a sufficient number of gradient vectors having substantially the same path; the significant subimages being assigned a first binary logic value; said second comparing means also determining nonsignificant subimages containing a limited number of gradient vectors having substantially the same path; the nonsignificant subimages being assigned a second binary logic value; and said device generating at least one final binary image (Ir) representing said acquired image (I) divided into said subimages (Ip), each having a respective binary logic value.

If said code is a bar code, the transforming means preferably double the angle ($\alpha$) formed by said gradient vector with a reference system.

Said transforming means preferably multiply the angle ($\alpha$) formed by said gradient vector with a cartesian reference system by a factor equal to the number of sides of the geometric figure forming the unit element of the optical code. More specifically, if the optical code is a two-dimensional code, the unit element of which is defined by four sides, the factor equals four; if the optical code is a two-dimensional code, the unit element of which is defined by six sides, the factor equals six.

BRIEF DESCRIPTION OF THE DRAWINGS

A number of non-limiting embodiments of the present invention will be described by way of example with reference to the accompanying drawings, in which:

FIG. 1 shows a schematic view of an automatic reading device implementing the method according to the present invention;

FIG. 2 shows a circuit block diagram of a detail of the FIG. 1 device;

DETAILED DESCRIPTION OF THE INVENTION

Figure 3:
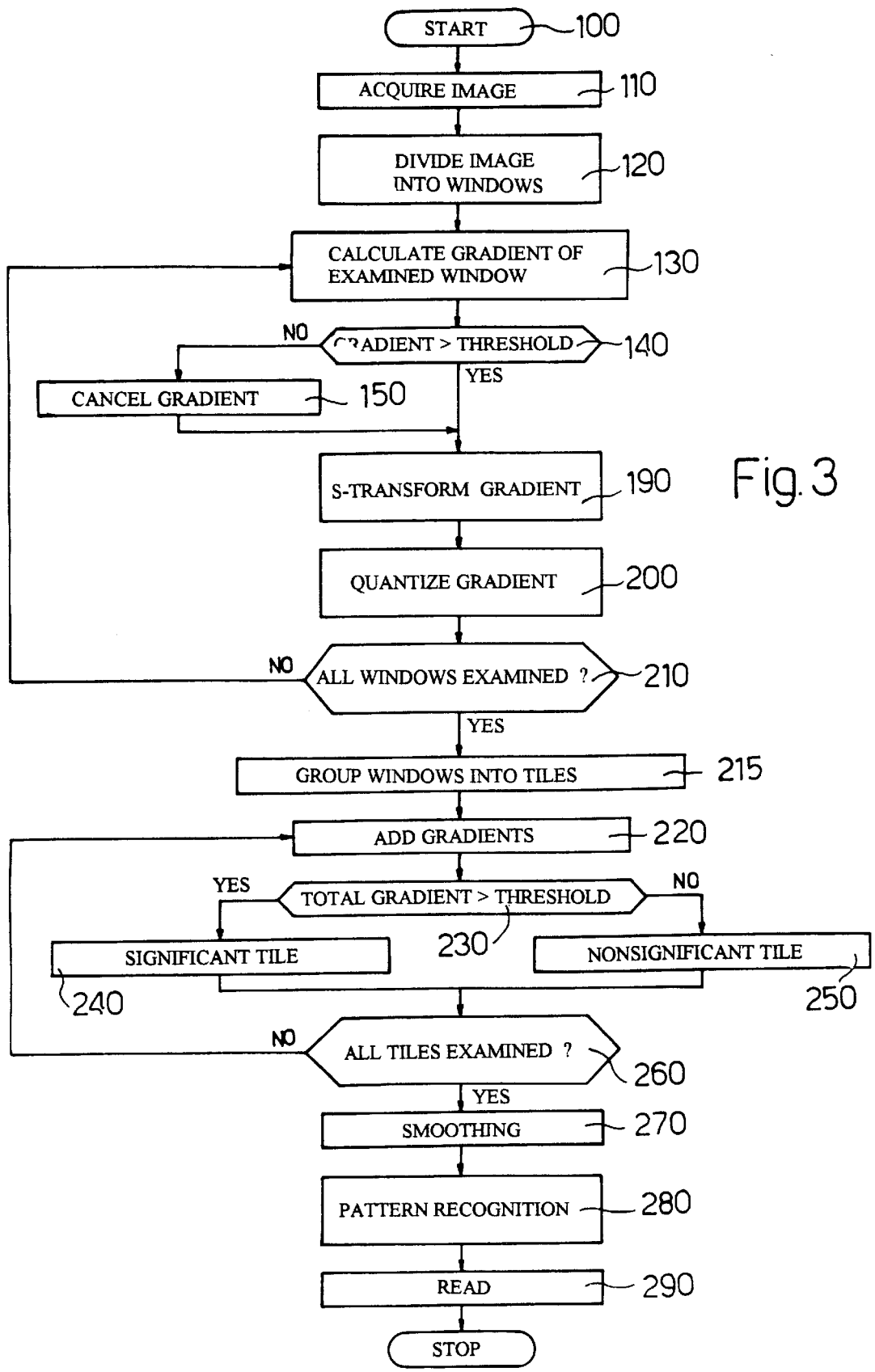
FIG. 3 shows the steps in the method according to the present invention.

Number 1 in FIG. 1 indicates an automatic optical code reading device comprising a reading head 5 facing a conveyor belt 6 and for scanning objects 7 located on conveyor belt 6, traveling in a straight horizontal direction D, and each bearing an optical code on the surface 7a facing reading head 5. The term "optical code" is intended to mean a set of graphic marks on a label or directly on the object (or any other support), whereby information is coded in the form of a sequence of black and white or variously coloured regions arranged in one or more directions. Examples of optical codes are bar, two-dimensional and colour codes.

In the example shown, object 7 comprises a bar code BC in the form of a number of straight, parallel, alternating light and dark bars.

Device 1 comprises an electronic processing and control unit 12 cooperating with reading head 5.

Device 1 also comprises a sensor 14 located along conveyor belt 6 to determine the height of objects 7 traveling along the belt; a sensor 15 for determining the presence of objects 7 in the vicinity of reading head 5; and a speed sensor 16 for determining the traveling speed of the belt (and hence the conveyed objects) with respect to reading head 5.

Device 1 also comprises a lighting device 17 for lighting the belt portion scanned by reading head 5.

With reference to FIG. 2, reading head 5 comprises a linear (e.g. CCD) telecamera 20 for scanning a line 6a of the belt (either continuously or when enabled by sensors 14, 15 and 16); and a circuit 22 for processing the output signals generated by telecamera 20. Circuit 22 comprises a filter 24 connected at the input to the output of telecamera 20; an image memory 26 connected at the input to the output of telecamera 20; and a programmable data processing unit (digital signal processor—DSP) 28 cooperating with filter 24 and memory 26.

FIG. 3 shows a block diagram of the operating cycle of processing circuit 22.

More specifically, and as shown in FIG. 3, a start block 100 goes on to a block 110, in which the lines 6a scanned by telecamera 20 are composed electronically to form a two-dimensional image (stored in memory 26) of conveyor belt 6 and/or objects 7, and so form a digital image I comprising a matrix of pixels, each characterized by a whole number defining its grey level. The acquired digital image I may comprise one or more objects 7 on conveyor belt 6, bearing one or more optical codes.

Block 110 is followed by a block 120, in which the acquired digital image I is divided into a number of elementary images (windows) If, each comprising a predetermined number N of pixels.

Figure 4:
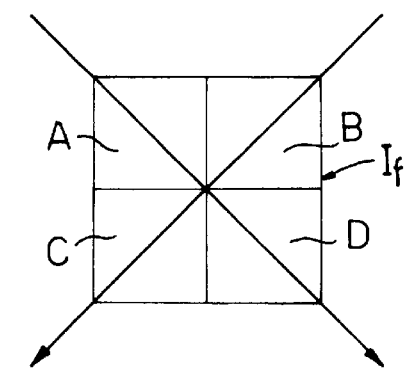
FIGS. 4 to 12 show how the code locating method according to the teachings of the present invention operates.

For example, windows If may comprise four pixels, as shown in FIG. 4.

Block 120 is followed by a block 130, in which a brightness gradient vector G is calculated for each window If of image I.

In the example shown (four-pixel window), if A, B, C and D are the respective numeric values of the brightness of the pixels in the window, the gradient vector is calculated according to the following equations:

$$GX = C - B$$

$$GY = D - A$$

$$\alpha = \arctg(GY/GX)$$

where GX and GY are the components of gradient vector G along the X and Y axes (FIG. 4), and $\alpha$ is the angle between the gradient and the X axis of a cartesian reference system, in which the X axis extends along the diagonals of pixels B,C, and the Y axis along the diagonals of pixels A,D.

Block 130 is followed by a block 140, which compares the magnitude of each calculated gradient vector with a threshold value Glim established at the initialization step. If the value of the gradient vector is below the threshold, block 140 goes on to a block 150, in which the gradient vector, considered nonsignificant by representing only gradual variations in brightness, is cancelled. Conversely (block 190 following block 140), the calculated gradient vector, considered significant by representing sharp variations in brightness, is kept for subsequent processing.

Figure 5:
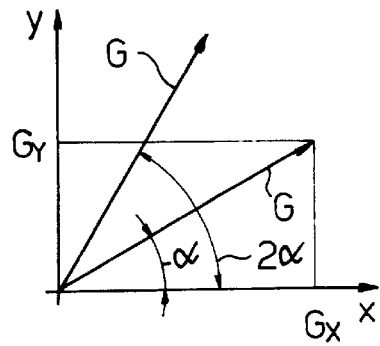

Block 190 performs a so-called "S-transform" of each previously calculated and selected gradient vector. More specifically, if the optical code is a bar code, angle $\alpha$ of each gradient vector is doubled (FIG. 5).

The transformation operator in block 190 is capable of passing from gradient space (defined by magnitude, path and direction) to path space (defined by magnitude and path), so that, when S-transformed, two gradients of the same magnitude and path but opposite directions are mapped in the same path space vector. If the S-transform were not performed, in fact, the mean of two vectors of the same magnitude and path but opposite directions would obviously give a zero result, and the information associated with the gradients would be lost. To locate a bar code, which comprises a number of black bars alternating with white spaces, both black to white and white to black transitions, i.e. vectors of opposite directions, must be taken into account.

Two gradient vectors G1 and G2 of the same magnitude and path but opposite directions have the same magnitude |G| and respective angles $\alpha_1$ and a $\alpha_2$ where $\alpha_2 = \alpha_1 + 180°$. When S-transformed, the angle of vector G1 equals $2\alpha_1$, and the angle of vector G2 equals $2\alpha_2 = 2(\alpha_1 + 180°) = 2\alpha_1 + 360°$, i.e. vector G1 is now parallel to vector G2 and has the same direction.

Other two-dimensional optical codes, such as so-called "ID-MATRIX" codes, comprise square black or white unit elements, and involve identifying changes in brightness from white to black and black to white in four perpendicular directions, i.e. identifying four gradient vectors of the same magnitude and at 90° to one another (i.e. having respective angles $\alpha$, $\alpha+90°$, $\alpha+180°$, $\alpha+270°$). In this case, the S-transform in block 190 multiplies the angles of the four gradient vectors by 4 to generate four gradients, all with the same path $4\alpha$; and the four S-transformed vectors are added to give a vector of four times the magnitude of the gradient vectors and path $4\alpha$.

Other two-dimensional codes, such as "MAXICODES", comprise hexagonal black or white unit elements, and involve identifying changes in brightness from white to black and black to white in six directions to give six gradient vectors of the same magnitude and at 60° to one another (i.e. having respective angles $\alpha$, $\alpha+60°$, $\alpha+120°$, $\alpha+180°$, α+240°, α+300°). In this case, the S-transform in block 190 multiplies the angles of the six gradient vectors by 6 to generate six gradients, all with the same path 6α; and the six S-transformed vectors are added to give a vector of six times the magnitude of the gradient vectors and path 6α.

Generally speaking, for any type of two-dimensional optical code, the S-transform multiplies the angles of the gradient vectors by a factor equal to the number of sides of the unit element of which the code is formed. More specifically, the S-transform provides for transforming the previously selected gradients to determine a predetermined path and direction, which are assigned to all the calculated gradient vectors.

Figure 6:
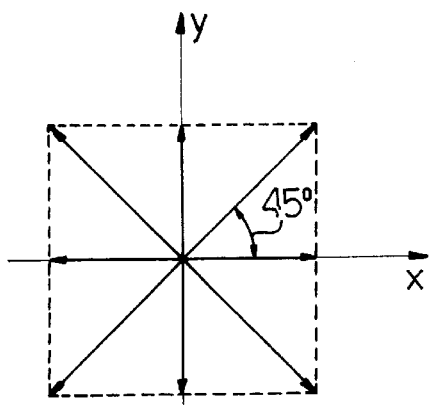

Block 190 is followed by a block 200, in which each gradient vector G transformed in block 190 is approximated to the closest of a set of reference vectors (gradient vector quantization). The reference vector set may comprise four first unit vectors perpendicular to one another, and four second vectors perpendicular to one another and forming a 45° angle with the first vectors (FIG. 6).

Block 200 is followed by a block 210, which determines whether all the windows If defined in block 120 have been examined (and the relative gradient vectors calculated). In the event of a negative response (windows If still being examined), block 210 goes back to block 130 to calculate a further gradient vector. Conversely (windows If all examined), block 210 goes on to block 215.

Block 215 groups the quantized gradients of image I into a number of subsets (subimages) or tiles Ip, which are formed by dividing the acquired image I into a number of subimages (tiles) Ip, each comprising a number of windows If. For example, tiles Ip may comprise a hundred pixels of the original image I, and therefore (in the example shown) twenty-five windows If (each comprising four pixels).

The next processing step provides for determining which portions of the digitized original image I contain gradient vectors indicating brightness transitions compatible with the type of optical code being located. For example, a bar code, comprising parallel, side by side black and white bars, involves identifying white to black and black to white brightness changes in two directions to give two gradient vectors of the same path but opposite directions.

Block 215 is followed by a block 220, which adds the gradient vectors processed in blocks 190, 200 and forming part of a subimage Ip. That is, the S-transformed and quantized gradient vectors of the various windows If are composed to generate a total gradient vector Gs relative to the currently selected tile Ip.

Block 220 is followed by a block 230, in which the total gradient vector Gs is compared with threshold values. If the total gradient vector Gs exceeds the threshold values, block 230 goes on to block 240. Conversely (total gradient vector Gs below the threshold values), block 230 goes on to block 250.

Figure 7:
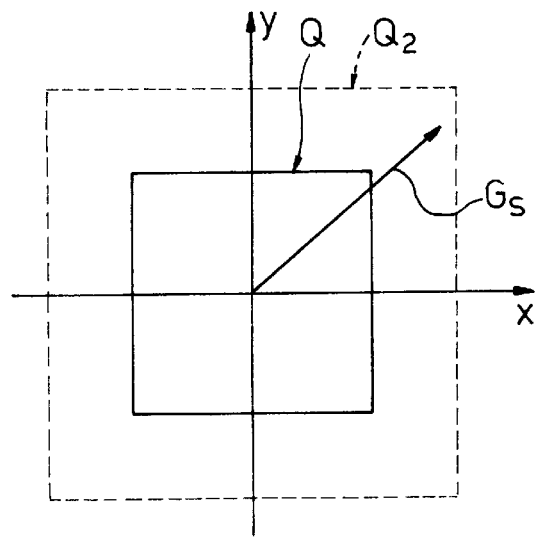
Figure 8:
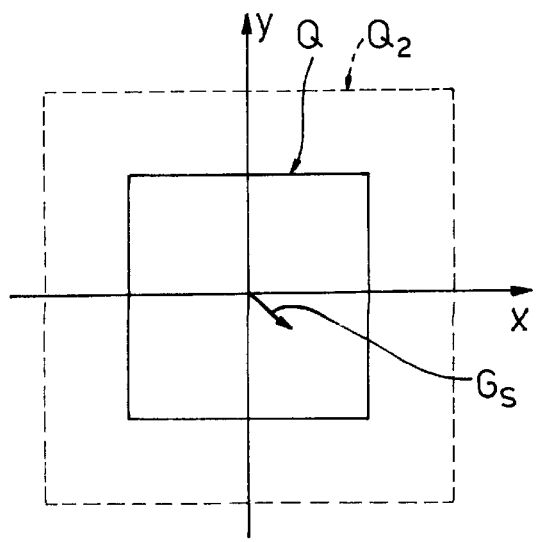

In an X,Y cartesian reference system, the threshold values may be represented by the sides of a square Q (FIGS. 7 and 8). In which case, if one end of total gradient vector Gs falls within square Q (FIG. 8), block 230 goes on to block 250. Conversely (end of total gradient vector Gs outside square Q—FIG. 7), block 230 goes on to block 240. FIGS. 7 and 8 also show a square $Q_2$ representing the maximum possible value of total gradient vector Gs.

The situation determined in block 240 is that in which the value of the total gradient vector in the path space exceeds the threshold, in which case, the tile Ip in question is considered significant by comprising a sufficient number of gradient vectors of significant magnitude and substantially the same path (possible presence of an optical code and, in the example described, of a bar code). The selected tile Ip is therefore assigned a first logic value (in particular, a logic "1") indicating tile Ip is to be considered significant.

The situation determined in block 250 is that in which the value of the total gradient vector in the path space is below the threshold, in which case, the tile in question is considered nonsignificant by comprising an insufficient number of gradients of significant magnitude and substantially the same path. The selected tile is therefore assigned a second logic value (in particular, a logic "0") indicating tile Ip is to be considered nonsignificant.

Blocks 240, 250 are followed by a block 260, which determines whether all the tiles Ip of image I have been examined. In the event of a negative response (image still being examined), block 260 goes back to block 220 to examine a further tile Ip. Conversely (examination of image I completed), block 260 goes on to block 270.

Figure 9:
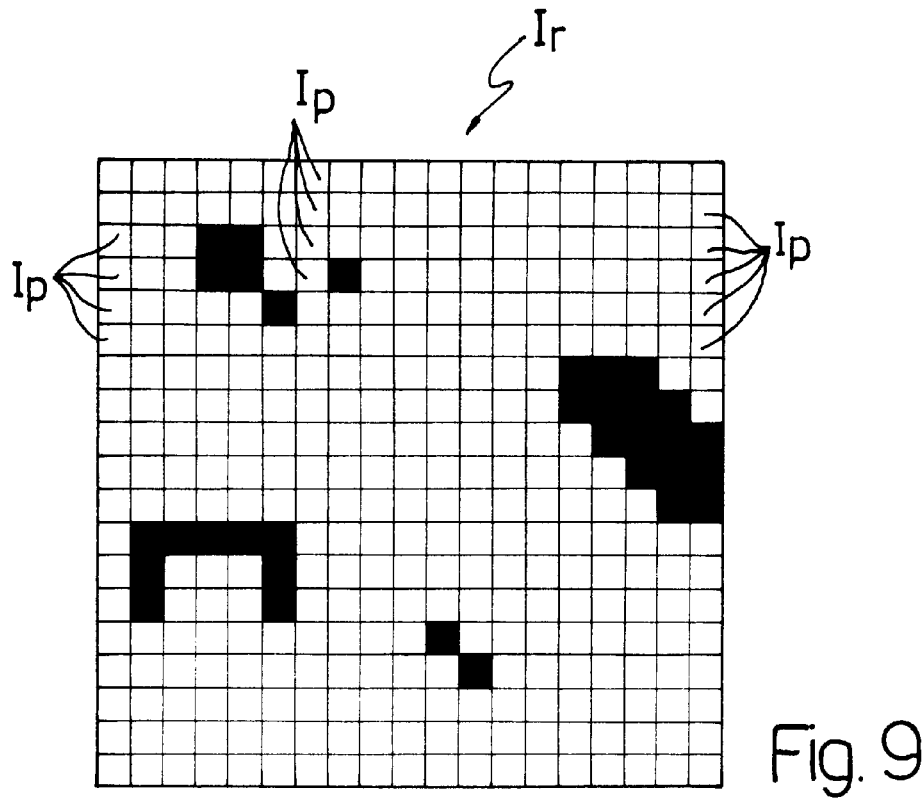

The output of block 260 is a final binary image Ir (FIG. 9) showing image I divided into a number of contiguous tiles Ip, each of which has a logic value "1" (significant "black" tile) if probably containing optical code images, or a logic value "0" (nonsignificant "white" tile) if probably containing no optical code images. The elementary unit by which final image Ir is represented is the same size as tile Ip. That is, tiles Ip constitute the pixels of final image Ir.

The final image Ir is supplied to the next block 270, which provides for further reducing the amount of information for subsequent processing, in addition to the gradual, drastic reduction already made by the above process up to this point.

Figure 10:
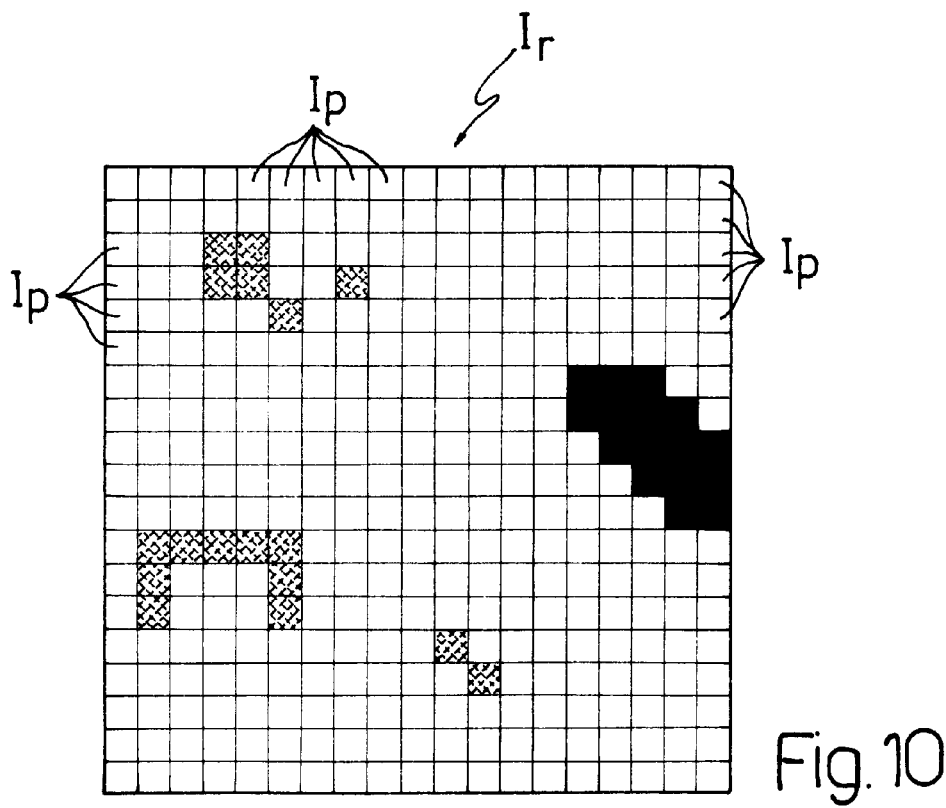

The operation performed in block 270 (known as SMOOTHING) replaces the binary value of an original tile Ip in final image Ir with that of the majority of adjacent tiles, and provides for limiting the effect of acquisition noise and eliminating any "unclear" portions of the image. In the case of block 270 (FIG. 10), smoothing provides for eliminating any small-area or narrow clusters (shown by the hatched portions in FIG. 10). The elementary unit by which final image Ir is represented obviously remains the same size as tile Ip, and noise is reduced at the expense of a loss in clearness of the image.

At this point, the final image Ir, smoothed as described above, clearly shows the possible code portions, but still comprises apparently significant spurious portions (i.e. "black" tiles) not actually corresponding to bar codes and containing a large number of parallel gradients (e.g. portions relative to tables, labels, photographs, etc.).

The next block 280 provides (in known manner) for automatically recognizing the spurious portions and selecting the portions corresponding to the bar code by means of an automatic pattern recognition process for discriminating between the spurious portions and those corresponding to the bar code.

The step performed in block 280 provides for recognizing all the groups of significant ("black") tiles most likely to correspond to a bar code.

Possible ways of examining significant tile groups are:
determining the area of the significant tile group, and rejecting any groups with an area below a first reference value or above a second reference value;
determining the window defined by the significant tile group, and rejecting any defined windows of a size other than that of a possible code; and
determining the barycenter of the significant tile group, and rejecting any groups with a barycenter at a distance from the center of the defined window over and above a given threshold value.

Block 280 therefore rejects some significant tile groups, elects other significant tile groups as corresponding to optical codes, and generates a number of elected significant tile groups, each defining a portion of image I containing a respective optical code. To read the optical code, the read algorithm (block 290 downstream from block 280) then processes in known manner the portion of image I relative solely to the portions corresponding to the elected tile groups.

The method described above therefore provides for effectively and rapidly locating the portion corresponding to the optical code in the image picked up by telecamera 20. As opposed to processing the whole digitized image I, the code reading algorithm (block 290) only processes the portions corresponding to the optical code image, thus greatly reducing the amount of information processed as compared with the amount acquired by the telecamera. Moreover, the S-transform in block 190 prevents information being lost due to the elision of vectors of the same path but opposite directions, thus further enhancing the efficiency of the location method; and, as the method described groups the tiles regardless of the predominant path of the gradients in each tile, tiles with predominantly perpendicular gradients may be placed in the same group.

The method described above involves the processing of a large amount of data, and, as objects 7 are conveyed on belt 6 at high speed (about 1–3 meters a second), only a very limited amount of time is available in which to locate and subsequently read the code. As such, to further improve the processing speed of the method according to the present invention, the initial operations corresponding to blocks 130–250 of the present method and characterized by the processing of a large amount of data by means of fairly straightforward algorithms may be performed using electronic circuits (HARDWARE) implementing the operations. Conversely, the final operations corresponding to blocks 270–290 of the present method and characterized by the processing of a small amount of data using fairly complex algorithms may be performed by a program (SOFTWARE). More specifically, the gradient calculation in block 130 may be performed by a first circuit (not shown) defining two subtractors and a digital delay line, and generating components GX and GY of gradient vector G. The operations in blocks 140, 150, 190 and 200 may be performed by a second circuit (not shown) mainly comprising a memory, receiving components GX and GY, and generating components Sx and Sy of the S-transformed and quantized gradient vector. The operations in block 220 may be performed by a third circuit (not shown) comprising a digital filter, adders and delay lines, receiving components Sx and Sy, and generating the x and y components of the total gradient vector. And finally, the operations in blocks 230, 240 and 250 may be performed by a fourth circuit (not shown) receiving the x and y components of the total gradient vector, and comprising a comparator, a memory and a series of adders.

By way of an alternative, in block 230, the total gradient vector Gs may be compared with threshold values and a number of reference paths. That is, the cartesian space in which total gradient vector Gs is located may be divided into a central portion defining the limit values of the threshold vector, and into a number of radial portions outside the central portion and corresponding to respective total gradient vector paths. Each radial portion (and, hence, each total gradient vector path) corresponds to at least one respective binary plane in which the total gradient vector is mapped. More specifically, the orientation of the total gradient vector provides for selecting at least one respective binary plane comprising a number of tiles. Each tile is assigned a "1" or "0" according to whether the respective total gradient vector is respectively above or below the threshold, so as to build a number of binary images, each similar to the one in FIG. 9, i.e. divided into a number of contiguous tiles Ip of logic "1" (significant "black" tile) or logic "0" (nonsignificant "white" tile).

Figure 11:
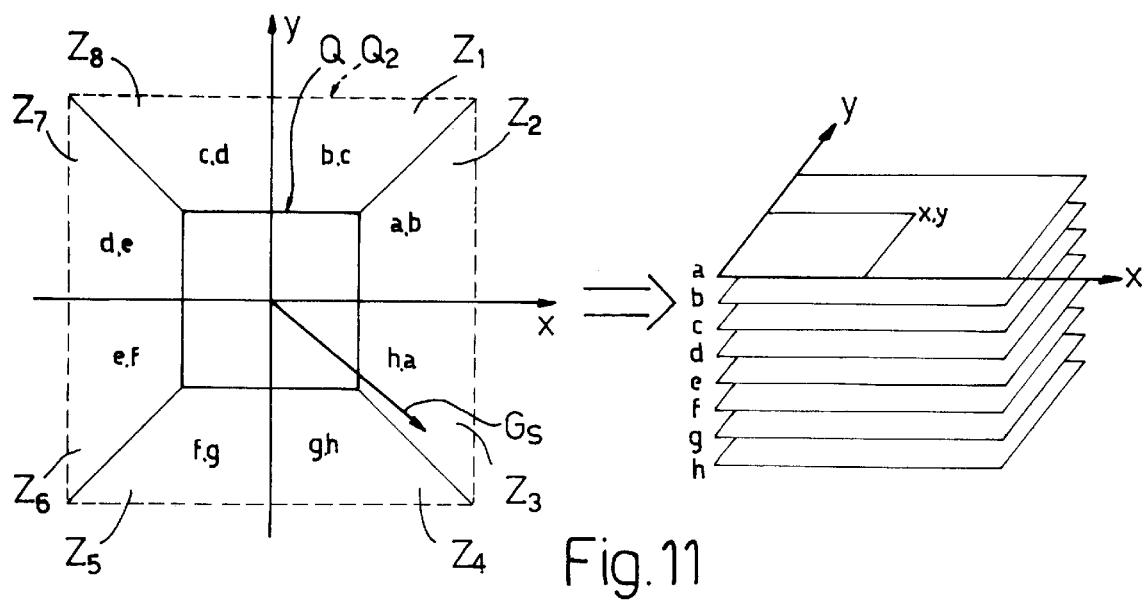

In the FIG. 11 example, the cartesian space in which total gradient vector Gs is located is divided into a central portion (defined by a square Q) defining the minimum threshold vector values, and into eight symmetrical radial portions $Z_1$–$Z_8$ outside square Q and corresponding to respective paths of total gradient vector Gs. Each radial portion (and, hence, each total gradient vector path) corresponds to two respective binary planes a–h in which the corresponding tile Ip is assigned a "1", whereas, in all the other planes, the corresponding tile Ip is assigned a "0", so as to build eight binary images, each similar to the one in FIG. 9. The analysis performed in block 280 is repeated for each of the various binary planes to locate the groups of significant (black) tiles Ip corresponding to optical code images. The division into multiple planes, each corresponding to one path, provides for improving the selectivity of the location process.

Figure 12:
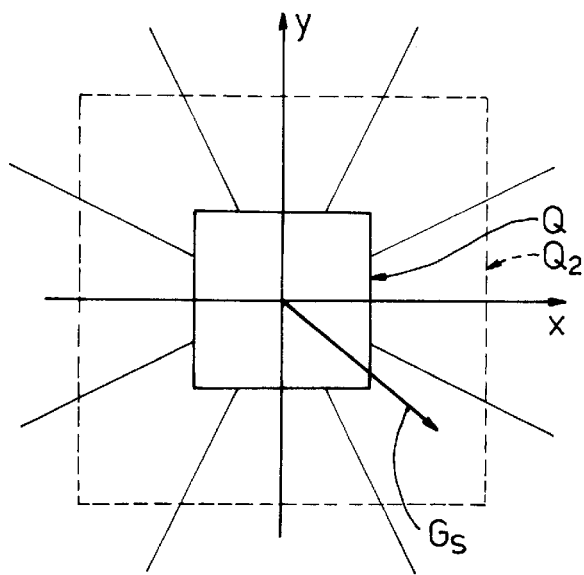

FIG. 12 shows said space divided into a larger number of radial portions than in FIG. 11, and more specifically into twelve portions. In this case, too, the orientation of the total gradient vector Gs of each tile Ip is determined to locate the plane/s of the portion relative to total gradient vector Gs, and so build a number of binary images.

In a further variation, N binary plane smoothing may be replaced by a mean total vector operation.

In which case, each total vector Gs generated by block 220 for a tile Ip is replaced by the mean total vector of all the tiles within an adequate neighbourhood of the tile Ip in question (e.g. a neighbourhood of three by three tiles Ip). The resulting total vector may then be processed in the same way as previously (blocks 230, 240 and 250), i.e. compared with threshold values to determine the significant tile groups. In which case, the binary smoothing operation in block 270 may be dispensed with.

Clearly, changes may be made to the method as described and illustrated herein without, however, departing from the scope of the present invention.

I claim:

1. In the method of locating an optical code applied to an object, wherein said method includes the steps of:

a) acquiring at least one image of an object bearing said code;

b) dividing said acquired image into a number of elementary images each comprising a predetermined number of pixels;

c) assigning to each said pixel a pixel brightness value;

d) calculating a brightness gradient vector for each of said elementary images; and e) comparing said calculated gradient vectors and selecting therefrom the vectors of magnitude above at least one threshold value representing rapid variations in brightness; the improvement comprising:

f) transforming said previously selected gradient vectors to thereby determine a given path and a given direction; and g) assigning said path and said direction to all said transformed gradient vectors.

2. The method of claim 1 wherein said improvement further includes the step of dividing said at least one acquired image into a number of sub-images each comprising a number of said elementary images.

3. The method of claim 2 wherein said improvement further includes the steps of adding the transformed gradient vectors of selected sub-images and calculating therefrom a total gradient vector.

4. The method of claim 3 wherein said improvement further includes the steps of: comparing the said total gradient vector of each of said sub-images with reference values and determining therefrom both significant sub-images comprised of a sufficient number of gradient vectors having substantially the same path and nonsignificant sub-images comprised of a limited number of gradient vectors having substantially the same path; assigning to said significant sub-images a first binary logic value; and assigning to said nonsignificant sub-images a second binary logic value.

5. The method of claim 4 wherein said improvement further includes the step of generating at least one final binary image representing said acquired image divided into said sub-images, each having a respective binary logic value.

6. The method of claim 5 wherein said optical code includes a unit element defined by a geometric figure having at least two sides and wherein said method further includes the steps of, during said transforming step:

forming an angle of said gradient vector with a cartesian reference system, and multiplying said angle so formed by a factor equal to the number of sides of said geometric figure of said optical code.

7. A method according to claim 6 wherein said angle so formed is multiplied by a factor of two.

8. A method according to claim 6 wherein said optical code is a two-dimensional code having a unit element defined by four sides, and wherein said multiplying step includes multiplying said angle by a factor of four.

9. A method according to claim 6 wherein said optical code is a two-dimensional code having a unit element defined by six sides, and wherein said multiplying step includes multiplying said angle by a factor of six.

10. A method according to claim 6 which includes the further step, following said transforming step, of quantizing said calculated gradient vectors by approximating said vectors to the closest vector in a series of reference vectors.

11. A method according to claim 6 which further includes the step of processing said final binary image, said step including replacing the binary value of each said sub-image with the binary value of the majority of adjacent sub-images.

12. A method according to claim 6 further including a pattern recognition step which includes:

examining said final image to determine and recognize the sub-image groups of said first binary value; and thereafter distinguishing from the so-recognized sub-image groups, typical sub-image groups having said first binary value and most likely corresponding to significant portions of said acquired image corresponding to digital code images.

13. A method according to claim 12 which includes the further step, following said pattern recognition step, of automatically reading said code contained in said significant portions of said acquired image.

14. A method according to claim 6 wherein the step of comparing the said total gradient vector includes comparing said total gradient vector with threshold values and with a number of reference paths; dividing the cartesian space in which said total gradient vector is representable into a central portion defined by threshold values and into a number of radial portions outside the central portion and corresponding to respective paths of said total gradient vector; each radial portion corresponding to at least one respective binary plane comprising a number of sub-images; and determining the binary value of said sub-images by comparing said total gradient vector with said threshold values.

15. A method according to claim 6 wherein the steps of adding the transformed gradient vectors of selected images and calculating therefrom a total gradient vector are followed by the steps of:

determining a mean total gradient vector of all said sub-images within a predetermined neighborhood of said sub-images to thereby generate a composite total gradient vector;

replacing each said total gradient vector with said composite total gradient vector; and comparing said composite total gradient vector with said threshold values used in said step of comparing the said total gradient vector with said threshold values and with a number of reference paths thereby to determine said significant sub-image groups.

16. In a device for locating an optical code applied to an object, the device comprising:

means for acquiring at least one image of an object bearing said code;

means for dividing said acquired image into a number of elementary images each comprising a predetermined number of pixels, and each pixel being assigned a pixel brightness value;

means for calculating a brightness gradient vector for each of elementary images; and means for comparing said calculated gradient vectors and selecting therefrom the vectors of magnitude above at least one threshold value representing rapid variations in brightness;

the improvement comprising means for transforming said previously selected gradient vectors to thereby determine a given path and a given direction; and for assigning said path and said direction to all said transformed gradient vectors.

17. A device according to claim 16 wherein said improvement further includes means for dividing said at least one acquired image into a number of sub-images each comprising a number of elementary images.

18. A device according to claim 17 wherein said improvement further includes means for adding the transformed gradient vectors of selected sub-images and calculating therefrom a total gradient vector.

19. A device according to claim 18 wherein said improvement further includes means for comparing the said total gradient of each of said sub-images with reference values and determining therefrom both significant sub-images comprised of a sufficient number of gradient vectors having substantially the same path and nonsignificant sub-images comprised of a limited number of gradient vectors having substantially the same path; the device further comprising means for assigning to said significant sub-images a first binary logic value and assigning to said nonsignificant sub-images a second binary logic value.

20. A device according to claim 19 wherein said improvement further includes means for generating at least one final binary image representing said acquired image divided into said sub-images, each having a respective binary logic value.

21. A device according to claim 16 wherein said optical code is a bar code formed of a geometric figure having at least two sides thereby to define the unit element of said optical code, and wherein said means for transforming includes means for determining an angle formed by said gradient vector with a cartesian reference system and for multiplying said angle by a factor equal to the number of sides of said geometric figure forming said unit element of said optical code.

22. A device according to claim 21 wherein said means for multiplying, multiplies said angle by a factor of two.

23. A device for locating an optical code applied to an object comprising:

image acquisition means for acquiring at least one image of an object bearing said code;
   first processing means for dividing said acquired image into a number of elementary images each comprising a predetermined number of pixels, and each pixel being assigned a pixel brightness value;
   second processing means for calculating for each of said elementary images a brightness gradient vector;
   first comparing means for selecting from said calculated gradient vectors, the vectors of a magnitude above at least one threshold value and representing rapid variations in brightness;
   transforming means for transforming the previously selected gradient vectors to determine a given path and a given direction, which path and which direction are assigned to all the calculated gradient vectors;
   tiling means for dividing said acquired image into a number of subimages, each comprising a number of elementary images;
   composing means for adding said previously transformed gradient vectors of a selected subimage to calculate a total gradient vector;
   second comparing means comprising means for comparing said total gradient vector of each of said subimages with reference values and for selecting therefrom significant subimages comprised of a sufficient number of gradient vectors having substantially the same path and nonsignificant subimages comprised of a limited number of gradient vectors having substantially the same path; said second comparing means further including means for assigning to the significant subimages a first binary logic value and means for determining nonsignificant subimages containing a limited number of gradient vectors having substantially the same path; means for assigning a second binary logic value to said nonsignificant subimages; and means for generating at least one final binary image representing said acquired image divided into said subimages, each having a respective binary logic value; and wherein said transforming means further includes means for multiplying the angle formed by said gradient vector with a cartesian reference system by a factor equal to the number of sides of the geometric figure forming the unit element of the optical code.

24. A device as claimed in claim 21 or 23, wherein said optical code is a two-dimensional code having a unit element defined by four sides, characterized in that said factor equals four.

25. A device as claimed in claim 21 or 23, wherein said optical code is a two-dimensional code having a unit element defined by six sides, characterized in that said factor equals six.

26. A method of locating an optical code applied to an object comprising:

a) an image acquisition step comprising acquiring at least one image of an object bearing said code;
   b) a first processing step comprising dividing said acquired image into a number of elementary images each comprising a predetermined number of pixels;
   c) assigning to each said pixel a pixel brightness value;
   d) a second processing step comprising calculating a brightness gradient vector for each of said elementary images;
   e) a first comparing step comprising comparing said calculated gradient vectors and selecting therefrom the vectors of magnitude above at least one threshold value representing rapid variations in brightness;
   f) a transforming step comprising transforming said previously selected gradient vectors to thereby determine a given path and a given direction;
   g) a tiling step comprising dividing said acquired image into a number of subimages, each comprising a number of elementary images;
   h) a composing step comprising adding the previously transformed gradient vectors of a selected subimage thereby to calculate a total gradient vector therefrom;
   i) a second comparing step comprising comparing said total to gradient vector of each of said subimages with reference values and selecting therefrom significant subimages containing a sufficient number of gradient vectors having substantially the same path; assigning to said significant subimages a first binary logic value; and assigning to said nonsignificant subimages a second binary logic value;
   j) generating at least one final binary image representing said acquired image divided into said subimages, each having a respective binary logic value;
   wherein said optical code includes a unit element defined by a geometric figure having at least two sides; and
   wherein said method further includes the step of, during said transforming step, multiplying the angle formed by said gradient vector with a cartesian reference system by a factor equal to the number of sides of the said geometric figure defining said unit element of said optical code.

27. A method as claimed in claim 10 or 26, characterized in that said reference vectors comprise four first unit vectors perpendicular to one another, and four second vectors perpendicular to one another and forming an angle of 45° with the first vectors.

* * * * *